US00RE35210E

United States Patent [19]

Johnson

[11] E Patent Number: Re. 35,210

[45] Reissued Date of Patent: Apr. 16, 1996

[54] SPRAYABLE INSULATING LINER COMPOSITIONS FOR METAL VESSELS

[75] Inventor: Howard B. Johnson, Cincinnati, Ohio

[73] Assignee: Consolidated Ceramic Products, Inc., Blanchester, Ohio

[21] Appl. No.: 12,949

[22] Filed: Feb. 3, 1993

Related U.S. Patent Documents

Reissue of:

[64] Patent No.: 5,036,029
Issued: Jul. 30, 1991
Appl. No.: 344,897
Filed: Apr. 28, 1989

[51] Int. Cl.[6] ..... C04B 35/04

[52] U.S. Cl. ..... 501/121; 501/112; 501/109

[58] Field of Search ..... 501/108, 109, 501/110, 112, 113, 121, 122

[56] References Cited

U.S. PATENT DOCUMENTS 4,703,022 10/1987 Johnson ..... 501/95
4,869,468 9/1989 Johnson ..... 266/44

*Primary Examiner*—Karl Group
*Attorney, Agent, or Firm*—Wood, Herron & Evans

[57] ABSTRACT

Sprayable aqueous insulating liner compositions for metal casting vessels such as permanent refractory lined tundishes are disclosed that contain a water insoluble and hydration resistant particulate refractory grain containing MgO, organic binder and fibers, with the composition being substantially free of water soluble alkali and alkaline earth metal oxides that would migrate during drying with the water to degrade the permanent refractory lining.

11 Claims, No Drawings

SPRAYABLE INSULATING LINER COMPOSITIONS FOR METAL VESSELS

Matter enclosed in heavy brackets [ ] appears in the original patent but forms no part of this reissue specification; matter printed in italics indicates the additions made by reissue.

BACKGROUND OF THE INVENTION

Expendable liners have been employed to protect the permanent refractory lining of a metal carrying vessel such as a ladle or tundish. These expendable liners are usually fabricated from a composition having heat insulating properties either in the form of premolded boards or gunnable materials. Recently, the technology in this area has shifted from performed boards or gunnable compositions to sprayable insulating compositions that consist essentially of a particulate refractory material premixed with a binder and sprayed in the form of an aqueous mixture onto the permanent refractory surface of a metal carrying vessel like a tundish. The sprayable compositions are designed so that they can be sprayed into either a warm or a cold tundish. The sprayable compositions are based on magnesite refractory grain so that long casting times with corrosive steels and slags are possible. In addition to the magnesite refractory grain, the sprayable insulating mixes contain additives to control the density of the sprayed mixture and binders to produce a strong coating after drying. The sprayable mixture usually contains about 25% water, thus there is no dust during spraying and virtually zero rebound. The sprayable compositions can be sprayed at very high application rates usually on the order of about 6,000 to 9,000 pounds per hour. Typically, about the same weight of material is used to spray a tundish as the weight of tundish boards required to line the same tundish.

One of the essential features of a sprayed tundish coating compared to a gunnable tundish liner is lower thermal conductivity which reduces energy losses from the steel; thus allowing reduced metal temperature in the ladle and basic oxygen furnace. This extends the useful life of the refractories in those vessels. The low thermal conductivity and high thermal expansion properties of the sprayed coating are essential so that the tundish may be easily stripped of these expendable coatings. The low thermal conductivity produces significantly lower temperatures behind the hot face of the sprayed coating and at the interface with the permanent tundish refractory liner. Maintaining low temperatures behind the hot face ant at the permanent refractory interface prevents reaction and/or sintering and thus gives a friable material layer behind the hot face that provides easy stripping of the remaining skull after casting. Thus, sprayed liners reduce wear on the permanent tundish refractory liner.

One of the current problems with sprayable insulating liner compositions is their tendency to degrade the permanent refractory liner and cause liquid formation at operating temperatures which in turn causes sticking of the skull. In other instances, even if the skull does not stick to the permanent refractory surface, compositions cause contamination of the permanent refractory surface thus producing spalling due to the increase in thermal expansion of the surface compared to the interior of the refractory. Sticking of the skull to the refractory causes some of the permanent refractory to be pulled out of the metal vessel when the skull is mechanically removed.

SUMMARY OF THE INVENTION

This invention is directed to an aqueous sprayable insulating liner composition for lining a permanent refractory surface on the inside of a metal carrying vessel. The sprayed liner is expendable and protects the permanent refractory surface during a pouring or casting cycle. The permanent refractory liner is usually made of refractory brick or refractory castable concrete compositions.

The composition that is adapted for admixture with water comprises a water insoluble and hydration resistant particulate refractory grain, or grain mixture, consisting essentially of at least about 50% by weight of MgO, an organic binder and fibrous materials in amounts effective to bind said particulate refractory material together in an essentially dry state after the aqueous composition has been sprayed onto the permanent refractory surface and dried. It has been found that the sprayable composition must be substantially free of water soluble alkali and alkaline earth metal oxides. These oxides have been found to migrate with the water to a permanent refractory surface and thereby detrimentally affect the surface by causing the problems heretofore mentioned in the background of this invention.

In particular, this invention is predicated in part upon the discovery that soluble alkali and alkaline earth metal oxides have been found to transport to, and concentrate at, the permanent refractory surface. These materials then degrade the permanent refractory and cause liquid formation at operating temperatures which in turn can cause sticking of the skull. Even if the skull does not stick, the contamination of the permanent refractory surface by alkali and alkaline earth metal oxides can produce spalling due to the increase in the thermal expansion of the surface compared to the interior. Therefore, it is critical to the success of this invention that all components of the sprayable insulating liner composition and aqueous mixture including a particulate refractory, and organic and inorganic binders and fibers, all must be chosen to eliminate amounts of soluble alkali and alkaline earth metal oxides that cause the problems aforementioned. Repeated use of sprayable aqueous compositions in the same tundish, increases the deposition of alkali or alkaline components on the permanent refractories; with the resulting sticking of the skulls and damage to the permanent refractories. Both alkali and alkaline earth metal oxides, for example, $Na_2O$, $K_2O$ and $C_aO$, quickly degrade the usual 50 to 70% alumina ($Al_2O_3$) brick and castable compositions of the permanent tundish linings. It has been found and phase diagrams predict that as these metal oxides build up on the high alumina refractory with each successive spraying and drying cycle, more and more liquid formation occurs at lower and lower temperatures. Thus, multiple spray-use cycles build up the alkali, or other flux, content at the surface of the permanent refractory to the point where the permanent refractory is degraded and sticking and/or spalling occurs.

Therefore, in a preferred form the insulating liner composition of this invention is adapted for admixture with water and spraying onto a permanent refractory surface on the inside of a tundish. The water insoluble and hydration resistant particulate refractory grain containing MgO is preferably supplied by a material selected from the group consisting of dead burned magnesite, used alone or mixed with olivine, magnesite-chrome prereacted grain and/or chrome ore. The organic binder is generally in an amount of from about 1 to about 10% by weight and the fiber content is present in an amount from about 0.3 to about 5% by weight. Fiber is preferably a combination of inorganic fiber and cellulose fibers, and mixtures thereof. Where mixtures are employed, the inorganic fibers are in an amount of up to about 2% by weight and the cellulose fibers are in an amount of up to about 3% by weight.

The method of spraying the insulating liner composition is achieved by mixing with water the particulate refractory material along with the organic binder and fibrous material, with said binders present in an amount effective to bind the particular refractory material together in an essentially dry state on the surface of the permanent refractory liner. Usually sprayable compositions containing about 20 to about 30% by water are employed. Machines are used to automatically mix the dry insulating tundish mix with the correct amount of water and to deliver the slurry to the gun for spraying. The machines or conditions for operating them form no essential part of this invention and reference is made to the literature such as "Spray Lining Tundishes—a Vital Cog in Revitalization of Steelmaking", S. Lasday, *Industrial Heating,* pp 30–33, April (1989), that is incorporated herein by reference. The mixed slurry is held in a hopper of the machine and is pumped through a hose to the gun as the operator calls for mix. At the gun, compressed air is added to propel the premixed slurry onto the permanent refractory tundish lining. The slurry can be sprayed onto the walls at rates of up to 9,000 pounds per hour. Generally, a thickness of about 1.25 to 1.75 inches of insulating slurry is applied, depending upon the length of casting and the location in the tundish. Thus, the slurry spray can be applied at rates of up to about 960 to 1200 square feet per hour for about one 1.25 inch thick lining. This makes the rate of application very rapid and a typical bloom or slab caster tundish can be sprayed in 20 to 40 minutes.

For rapid drying, the sprayed tundish can be heated at up to 1500° F. to dry out the slurry coating. Two hours at 750° F. is normally used to dry out a 1.5 inch thick coating when the tundish walls are cold when sprayed. Less drying time is required if the tundish walls are warm when sprayed. However, the maximum wall temperature during spraying should not exceed 200° F. or problems may occur with the slurry not sticking to the wall due to water vaporization as the slurry strikes the hot wall. After drying, the tundish can be cooled and used either cold or preheated. The sprayed tundish should be used within a few days to prevent the insulating magnesite lining from picking up water from the moisture in the air. The tundish can be redried if needed. Care should be taken when cooling the sprayed tundish after drying at high temperatures. High density refractories in the tundish, such as dams, weirs and pouring pans can be cracked by thermal shock during rapid cooling.

The procedure for determining amounts of soluble sodium oxide and calcium oxide involves extraction of a 120–140 grams sample of dry sprayable material with 250 mls of distilled water for a period of two hours using a Soxhlet extraction apparatus. The filtrate is diluted to one liter. Sodium and calcium ion concentration of the diluted filtrate is then determined by selective ion electrodes. It has been found that the soluble alkali and alkaline earth metal oxides should not be contained in the sprayable solids at levels of more than about 0.10% by weight of the dry material. More preferably, the tolerable amounts of these oxides are closer to levels of about 0.01% by weight or less.

DETAILED DESCRIPTION OF THE INVENTION

By way of illustrating and providing a better appreciation of the present invention, the following detailed description and examples are given concerning the sprayable refractory insulating liners of the invention and their properties. All of these materials must be carefully selected to be substantially free of amounts of water soluble alkali and alkaline earth metal oxides that degrade the permanent refractory liner.

In a preferred embodiment, the sprayable refractory insulating liners are formed by about 75% to about 98.5% by weight of a water insoluble and hydration resistant particulate refractory grain, or grain mixture, containing at least about 50% by weight MgO and about 1% to about 15% organic and inorganic binders and fibrous material. The MgO refractory grain, also known as magnesium oxide, dead burned magnesite, periclase grain or magnesia, can be derived from any suitable sources and especially from sources, such as natural, seawater or brine magnesite, or any other suitable sources, or mixtures thereof. The magnesite or periclase grain, however, preferably is of the type commonly referred to as dead burned magnesite or dead burned periclase. By "dead burned" magnesite or periclase is meant magnesite or periclase fired to high temperatures to produce a water insoluble and hydration resistant particulate refractory grain consisting essentially of well-sintered low porosity periclase crystals and this grain structure distinguishes it from the more reactive lower temperature calcined caustic magnesites. Nevertheless, it should be understood that it is preferred that the MgO refractory grain content, whether derived from natural, seawater or brine magnesite, periclase grain, or other suitable sources, should be substantially pure. By "substantially pure", it means containing at least about 80% MgO by weight on the basis of an oxide analysis, with the remainder, if any, being only minor amounts of incidental impurities essentially excluding soluble alkali and alkaline earth oxides. Generally, the best results are achieved when the particle size distribution of the MgO refractory grain is below 20 mesh as such grain sizes will be understood to a person of ordinary skill in the art.

In accordance with other aspects of the invention, the use of a blend of different magnesite sources for MgO refractory grain can be used to achieve the results. The blend should be of sources for MgO refractory grain having an MgO content so that the average MgO content of all the refractory grain is at least about 50%. Further, sources of MgO refractory grain should be selected on the basis of their low tendency to hydrate due to their high dead burning temperatures and as a result of their composition. Other suitable refractory grain may also be added in acceptable amounts to the particulate refractory MgO such as zircon and alumina, as taught in U.S. Pat. Nos. 4,696,455 and 4,703,022.

In carrying out the invention, the binder component may be derived from any suitable binder or mixtures of binders of those known in the refractory making and allied industries of organic and inorganic binders. Preheat or heating conditions cause some organic binders incorporated within the liners to first carbonize to produce a carbon bond and then to eventually burn out, for instance, starting at the hot face and sometimes throughout the entire sprayed thickness, of course, depending upon preheat time, temperature and spray coating thickness. Nonetheless, up until the point of burnout, the organic binders and the carbon bond produced serve to hold or bind the other materials together and comprise by weight of the liner from about 1.0% to about 10%. Samples of organic binders suitable to be employed in the liners of the present invention include, but are not limited to, starches, cereals, natural or synthetic resins, such as amino resin, phenolic resins or mixtures thereof. More particularly, powdered forms of the phenol-formaldehyde and urea-formaldehyde resins are best suited for use and most preferably is the phenol-formaldehyde resin. It should be appreciated that when the phenol-formaldehyde resin is employed, a catalyst such as hexamethylenetetraamine, also known as HMTA, should be added in sufficient amounts to polymerize the phenolformaldehyde resin to bond the refractory grains for making a rigid structure suitable for use as a liner.

In addition to providing binding support prior to the burnout of organic binder, the fibers serves to control the viscosity of the sprayed material to prevent it from slumping off near vertical walls after spraying and during drying. The inorganic fibrous material also serves to stick or hold the particulate refractory component together during preheat or heat conditions particularly after the organic binder and organic fiber has been consumed or burnt out. In further keeping with the invention, as to the fibers, the following are preferred: inorganic fibrous materials such as rockwool, slag wool, glass wool, chopped continuous fiberglass filament, refractory aluminum silicate fibers, and organic fibrous materials such as cellulosic materials derived from paper, synthetic organic fibers or the like, and particularly paper. These fibers generally serve to reinforce the sprayed material so that it stays in place when sprayed and during drying, preheating and while casting metal. The use of such fibers in the sprayable insulating mix also assists in producing a dried spray material with a low bulk density, whereby the heat-insulating effect thereof is improved. As noted above, the fibers represent by weight of the liner from 0% to about 10% and preferably up to about 5%.

In accordance with the present invention, the sprayable refractory insulating liner compositions contain about 20–30% by weight water to enable them to be pumped through rubber hose and to be sprayed when the slurry is mixed with compressed air in a spray gun. The sprayed liners are suitable for forming linings for casting vessels, such as hot tops, ladles, tundishes, troughs and pipes etc., which are intended to contain molten metals such as ferrous alloy metals. Preferably, the liners of the invention are employed in tundishes and the following examples illustrate the practice of the invention.

EXAMPLES

The following represents two preferred compositions A and B for manufacturing a sprayable refractory insulating liner in accordance with this invention. These compositions essentially are free of water soluble alkali and alkaline earth metal oxides, i.e., contain less than 0.10% by weight, or about 0.01% by weight of such oxides.

| Composition | Ingredient | Approx. % |
|---|---|---|
| A | Phenol-formaldehyde resin | 2.00 |
| | Hexamethylenetetraamine | 0.13 |
| | Paper | 0.80 |
| | Fiberglass | 0.80 |
| | Magnesite: about 90% MgO | 64.18 |
| | Olivine | 32.09 |
| | | 100.00% |
| B | Phenol-formaldehyde resin | 2.00 |
| | Hexamethylenetetraamine | 0.13 |
| | Paper | 0.80 |
| | Fiberglass | 0.80 |
| | Magnesite: 90% MgO | 32.09 |
| | Reacted Magnesite-Chrome Grain | 32.09 |
| | Olivine | 32.09 |
| | | 100.00% |

The compositions A or B are blended with about 20–30% water and sprayed under conditions of spray rate and air pressure as will be understood to one of skill in the art using a machine of the type referred to in the Industrial Heating article referred to above.

After spraying at rates of about 960 to 1200 square feet per hour to provide about 1.25 inch thick lining into a tundish, the coating is dried at about 750° F. Tundishes having a permanent refractory lining are repeatedly sprayed with composition like A and B above without any detrimental effects on the permanent refractory of the type noted in the background of this invention. Wherefore, it will be understood to persons of skill in this art that this invention provides advantages in overcoming prior art problems and variations may be made without departing from the scope hereof.

What is claimed is:

1. An insulating liner composition admixed with water and sprayable onto a permanent refractory surface the water being in sufficient amount of said water so that no dust and virtually no rebound of said admixture occurs upon spraying on the inside of a metal carrying vessel to form an expendable liner having low thermal conductivity and high thermal expansion so that the vessel may be easily stripped of said liner after use thereon, comprising a water insoluble and hydration resistant particulate retractory grain, or grain mixture, of at least about 50% by weight of MgO.

[an organic] *a* binder and fibers, said binder in an amount effective to bind said particulate refractory grain and fibers in an essentially dried state on said refractory surface, said composition being substantially free of water soluble alkali and alkaline earth metal oxides that would migrate during drying with said water to said permanent refractory liner thereby causing degradation or spalling of said permanent refractory.

2. The composition of claim 1 wherein said MgO is supplied by a material selected from the group consisting of magnesite, olivine, magnesite-chrome grain and chrome ore.

3. The composition of claim 1 wherein said organic binder is in an amount of from about 1 to about 10% by weight and said fibers are present in an amount of from about 0.3 to about 5% by weight.

4. The composition of claim 1 wherein said fiber is selected from the group consisting of inorganic fibers and cellulose fibers, and mixtures thereof.

5. The composition of claim 4 wherein said inorganic fibers are in an amount of up to about 2% by weight and said cellulose fibers are in an amount of up to about 3% by weight.

[6. The composition of claim 1 especially adapted for use as a sprayed tundish liner.]

7. The composition of claim 1 wherein no more than about 0.10% by weight of said soluble alkali and alkaline earth metal oxides are present in said composition.

8. The composition of claim 1 containing about 20 to about 30% of water.

*9. The composition of claim 1 wherein said binder is an organic binder.*

*10. The composition of claim 1 wherein said binder is an inorganic binder.*

*11. The composition of claim 7 wherein said binder is an organic binder.*

*12. The composition of claim 7 wherein said binder is an inorganic binder.*

* * * * *

UNITED STATES PATENT AND TRADEMARK OFFICE

CERTIFICATE OF CORRECTION

PATENT NO. : Re. 35,210

DATED : April 16, 1996

INVENTOR(S) : Howard B. Johnson

It is certified that error appears in the above-indentified patent and that said Letters Patent is hereby corrected as shown below:

Column 6, line 38, "said organic binder" should be --said binder--.

Signed and Sealed this

Twenty-seventh Day of August, 1996

Bruce Lehman

*Attest:*

BRUCE LEHMAN

*Attesting Officer*

*Commissioner of Patents and Trademarks*